United States Patent
Tillman et al.

(10) Patent No.: US 7,610,184 B1
(45) Date of Patent: Oct. 27, 2009

(54) SECTOR MESHING AND NEIGHBOR SEARCHING FOR OBJECT INTERACTION SIMULATION

(75) Inventors: Steven T. Tillman, Huntsville, AL (US); Andrew J. Witzig, Harvest, AL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 741 days.

(21) Appl. No.: 11/336,885

(22) Filed: Jan. 23, 2006

(51) Int. Cl.
  *G06F 17/50* (2006.01)
  *G06F 17/10* (2006.01)

(52) U.S. Cl. ............... 703/2; 703/5; 703/7; 703/9; 702/189; 345/537

(58) Field of Classification Search ............ 703/2, 703/5, 7, 9; 702/189; 382/128; 345/537
See application file for complete search history.

(56) References Cited

U.S. PATENT DOCUMENTS

| | | | |
|---|---|---|---|
| 6,195,625 B1 | 2/2001 | Day et al. | |
| 6,420,698 B1* | 7/2002 | Dimsdale | 250/234 |
| 6,678,642 B1 | 1/2004 | Budge | |
| 2002/0181751 A1* | 12/2002 | Hale | 382/128 |
| 2004/0006450 A1* | 1/2004 | Hale | 702/189 |
| 2006/0235659 A1* | 10/2006 | Stam | 703/2 |
| 2007/0242269 A1* | 10/2007 | Trainer | 356/336 |

OTHER PUBLICATIONS

J. W. Swegle, "An Analysis of Smoothed Particle Hydrodynamics", Mar. 1994, SAND93-2513.

(Continued)

*Primary Examiner*—Thai Phan
(74) *Attorney, Agent, or Firm*—Edell, Shapiro & Finnan, LLC

(57) ABSTRACT

Methods for computer-implemented simulation for the interaction of two or more objects are provided. Data describing particles that represent each of the objects is generated from geometric data for objects. The data for each particle describes a mass density, velocity and energy at a position of the corresponding object. The particles are grouped into sectors to define a computational mesh comprising a plurality of sectors, wherein each sector is a volume region at a position in space in which particles associated with the objects may reside. For each of a plurality of select particles, so called neighboring particles are determined that are within a region of influence with respect to a select particle. Computations are performed based on laws of conservation of mass, energy and momentum to produce updated values for mass, velocity, energy, pressure, stress and position for the particles at each of a plurality of time steps. According to one aspect, when determining neighboring particles for a given select particle, a search is made through a limited or bounded volume region with respect to the select particle that consists of the region of influence for the select particle at the previous time step and within those sectors in contact with or bordering the region of influence at the previous time step. According to another aspect, the plurality of select particles are identified as those particles that reside in an active sector, wherein an active sector is a sector that contains, or is adjacent to a sector that contains, particles that is actively involved in the engagement between the two objects. For example, an active sector is a sector that contains, or is adjacent to a sector that contains, at least one particle that has a velocity, pressure or stress greater than a corresponding predetermined amount.

31 Claims, 12 Drawing Sheets

OTHER PUBLICATIONS

J. J. Monaghan, "Smoothed Particle Hydrodynamics", Annu. Rev. Astron. Astrophys. 1992. 30: 543-74, Publisher: Annual Reviews Inc.

L. B. Lucy, "A Numerical Approach to the Testing of the Fission Hypothesis", Dec. 1977, vol. 82, No. 12, Publisher: The Astronomical Journal.

R. A. Gingold et al., "Smoothed Particle Hydrodynamics: Theory and Application to Non-spherical Stars", Mon. Not. R. astr. Soc. (1977) 181, 375-389, Publisher: Royal Astronomical Society.

PCT International Search Report and Written Opinion in counterpart International Application No. PCT/US07/60685, dated Mar. 13, 2008.

* cited by examiner

SECTOR MESHING AND NEIGHBOR SEARCHING FOR OBJECT INTERACTION SIMULATION

FIELD OF THE INVENTION

The present invention relates to computer simulations of physical phenomena, and more particularly to methods for reducing the amount of computations necessary during a particle-system based computer simulation of the engagement of two or more objects.

BACKGROUND OF THE INVENTION

Computer simulations for experiments involving the impact of one object with another object have widespread applications. For example, automobile manufacturers use such simulations in designing safer vehicles. In a totally different technology field, scientist uses such simulations to study the effectiveness of a missile destroying a moving or stationary target. Regardless of the particular application, it is an overall goal to design a computer simulation that can accurately produce data concerning possible outcomes of the physical phenomena of interest pertaining to two or more objects. However, there is a tradeoff between accuracy and simulation run time. Generally, the more complex a simulation is in order to achieve better accuracy, the longer it takes for that simulation to run to completion. In fact, very complex computer simulations, such as so-called "hydrocodes" can take several days or longer to execute on highly sophisticated models of certain physical events.

Computer simulations that model the interaction or engagement of two or more objects typically execute numerous computations at each time step through the engagement. For example, the computations may be based on equations for the laws of conservation of mass, energy and momentum. One type of modeling technique uses data for particles that represent each of the objects involved in the engagement. The particles representing the objects interact with each other according to the laws of conservation of mass, energy and momentum. The system of particles, also referred to as a computational mesh, is updated at each of a plurality of time steps through the engagement of the objects. At each of the time steps, it is necessary to consider the influence that particles from within the same object and from other objects have on each other. However, the reality is that at any given time step, not all of the particles in the system may have an active role in the engagement. Moreover, while each particle is affected by its neighboring particles, not all particles have a significant influence on other particles in the system.

If, at each time step, the number of particles involved in the computations is limited to those particles determined to have an active role in the engagement, the run time of the computer simulation can be greatly reduced with little or no expense to the fidelity of the results. Further, if each particle's significant neighboring particles can be efficiently determined at each time step, the run time of the simulation can be reduced.

SUMMARY OF THE INVENTION

Briefly, methods for computer-implemented simulation for the interaction of two or more objects are provided. Data describing particles that represent each of the objects is generated from geometric data for objects. The data for each particle describes a mass density, velocity and energy at a position of the corresponding object. The particles are grouped into sectors to define a computational mesh comprising a plurality of sectors, wherein each sector is a volume region at a position in space in which particles associated with the objects may reside. For each of a plurality of select particles, so called neighboring particles are determined that are within a region of influence with respect to a select particle. Computations are performed based on laws of conservation of mass, energy and momentum to produce updated values for mass, velocity, energy and position for the particles at each of a plurality of time steps. According to one aspect, when determining neighboring particles for a given select particle, a search is made through a limited or bounded volume region with respect to the select particle that consists of the region of influence for the select particle at the previous time step and within those sectors in contact with or bordering the region of influence at the previous time step.

According to another aspect, the plurality of select particles are identified as those particles that reside in an active sector, wherein an active sector is a sector that contains, or is adjacent to a sector that contains, particles that is actively involved in the engagement between the two objects. For example, an active sector is a sector that contains, or is adjacent to a sector that contains, at least one particle that has a velocity or stress greater than a corresponding predetermined amount.

The particles are regrouped and neighboring particles are identified at each time step. By limiting the volume region which a search is made for neighboring particles, and by performing the neighbor search step only for particles in sectors that are "actively" involved in the engagement, the number of computations performed at a given time step is greatly reduced.

The computer simulation run time is significantly reduced by focusing computational resources on the particles that are most relevant to the engagement of the objects at a particular time step, therefore reducing the number of particles in the computational mesh at a given time step.

DETAILED DESCRIPTION

Figure 1:
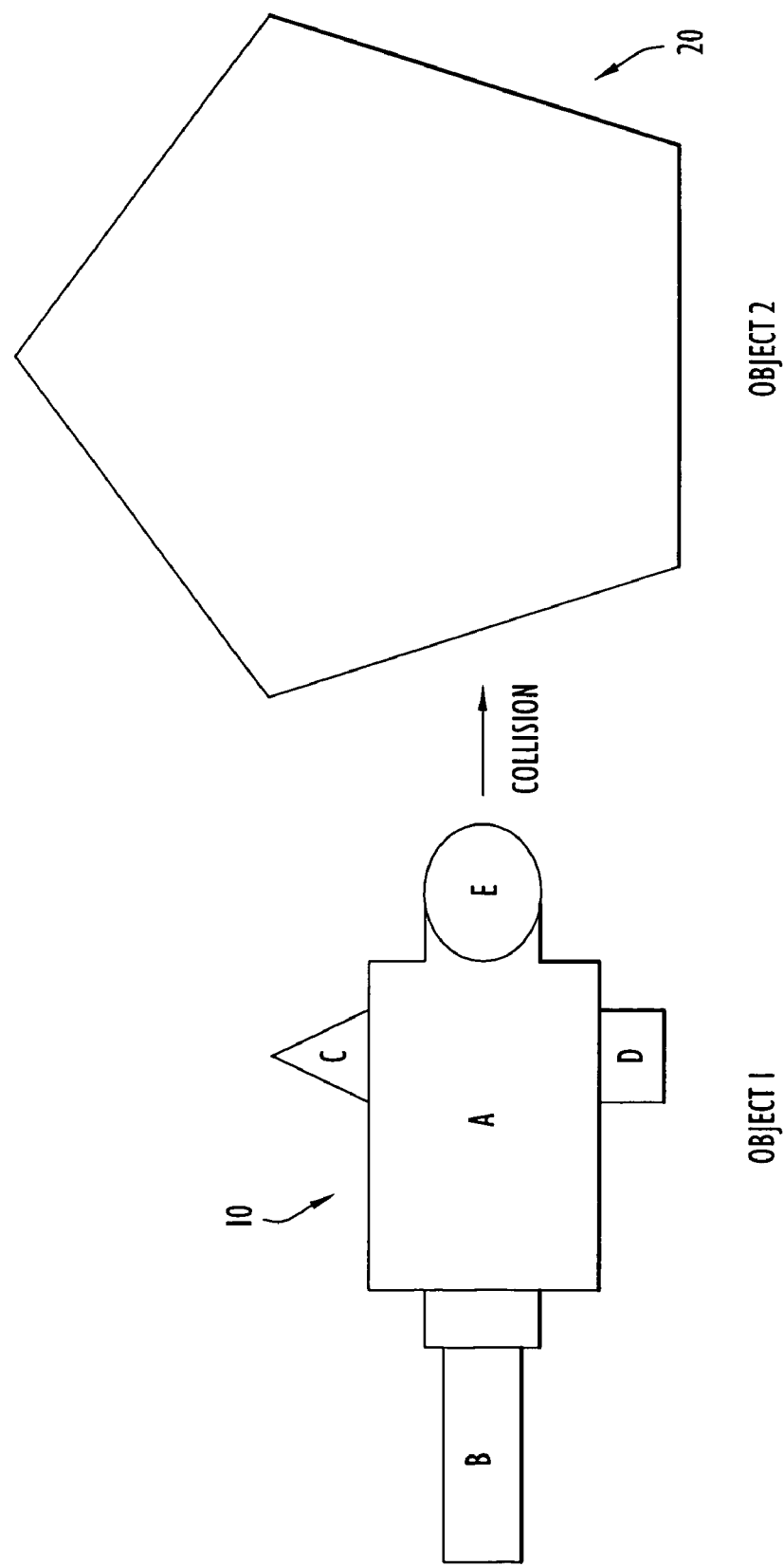
FIG. 1 is a diagram depicting interaction of two objects, where data representing the objects are processed for computer simulation of the object interaction according to an embodiment of the present invention.

Referring first to FIG. 1, an experiment is depicted in which a first object 10 is to collide with a second object 20. The objects 10 and 20 could be any two objects that may collide with each other, or one of which may explode or detonate near or on the other, etc. Either or both objects may be moving, or one object may explode in or near the other object. Non-limiting examples of the experiment include: object 20 is stationary (e.g., a building structure) and object 10 is moving and collides or explodes near object 20, where object 10 is a moving vehicle such as a land vehicle, air vehicle (airplane, missile, etc.); object 20 is moving and object 10 is moving and the two objects collide with each other, one of which may or may not set off an explosion upon or near impact, where object 20 is an air vehicle and object 10 is an air vehicle; objects 10 and 20 are both stationary and one explodes inside or near the other object. It should be understood that while only two objects are shown in FIG. 1, the experiment may involve more than two objects.

For these types of experiments, simulation algorithms have been, and are being, developed to predict the possible outcomes of such events using computations that represent the various physical phenomena occurring. Some simulation algorithms use specialized data describing the objects in the experiment. One type of specialized data is data for a collection of "particles" that represent each object, where each particle is defined generally by mass, density, velocity, energy, pressure and stress (so called "particle parameters") at a position of the object at a given point in time during the experiment. Computations are then made on each of the particles representing each object using equations describing the physical phenomena occurring during the experiment to ultimately determine possible outcomes. These computations are very complex and can therefore take a significant amount of time to complete throughout time steps of an experiment. Therefore, according to the present invention, techniques are provided to reduce the number of the computations made at each time step for the particles in the system, also referred to as the computational mesh, comprised of the collection of particles representing each object in the simulation.

Figure 2:
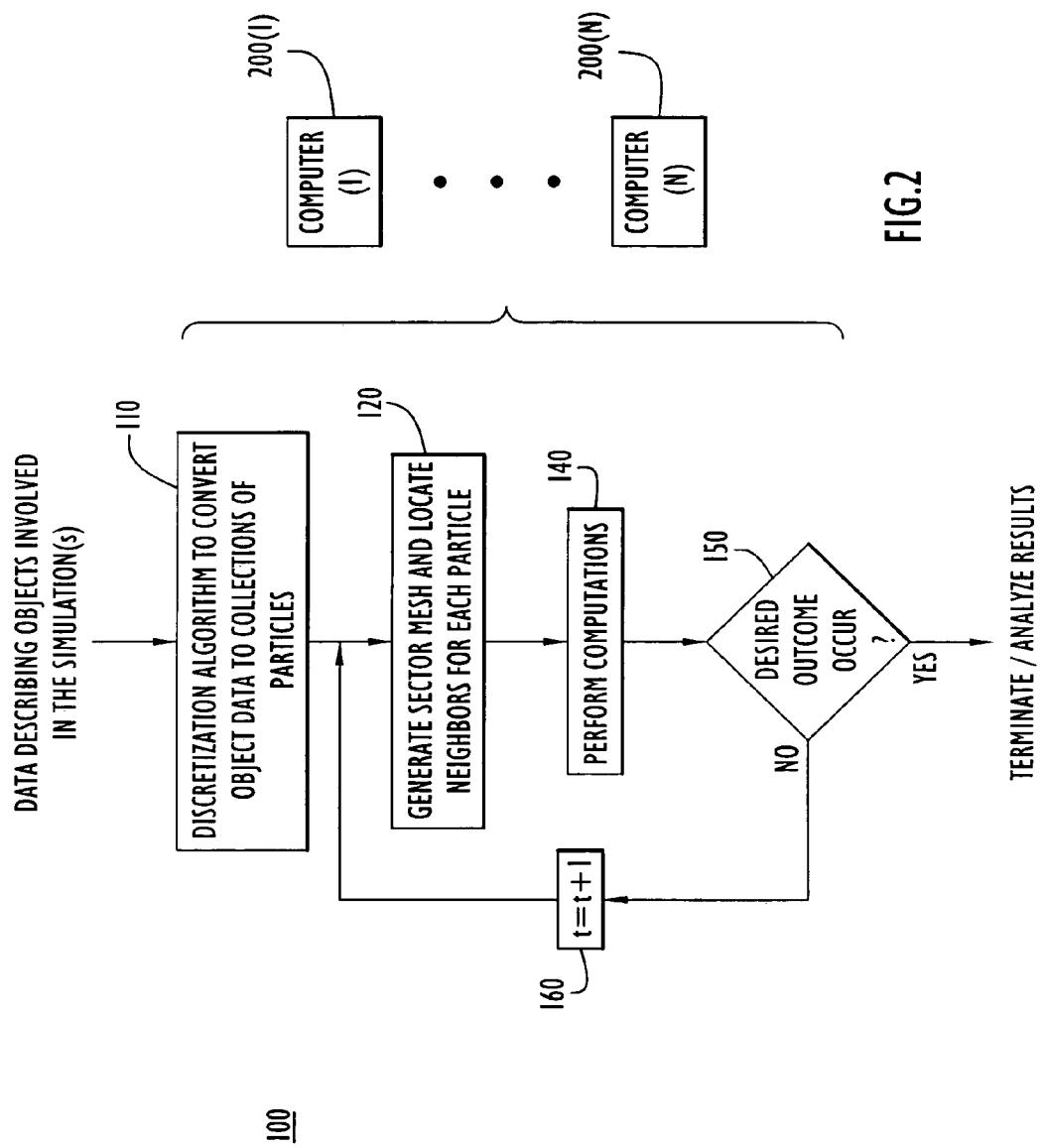
FIG. 2 is a flow chart generally depicting a process for generating data describing collections of particles representing the objects for computer simulation of the object interaction according to an embodiment of the present invention.

With reference to FIG. 2, a process 100 is generally shown for such an improved computer simulation. Data describing the two or more objects involved in the computer simulation are received as input. A discretization algorithm is then executed at 110 to convert the object data for each object to a collection of particles. This may involve separately each distinct component of each object. FIG. 1 shows, as an example, that object 10 may consist of distinct components or portions A, B, C, D and E. A collection of particles is generated at 110 for each of these components for object 10. A collection of particles is also generated for object 20.

Next, at 120, a so-called computational mesh is generated from the collection of particles and the neighboring particles are located and identified for each particle in the computational sectorized mesh. The purpose of this step is also to determine which particles are "active" in the interaction among the objects and to limit the computations to only those active particles and a limited number of neighboring particles for the active particles.

After the sector mesh and neighboring identification processing performed at 120, the computations are performed at 140 for the active particles based on the identified neighbors according to the governing equations associated with the physical phenomena being modeled by the computer simulation.

The results of the computations are examined at 150 to determine if a desired outcome has occurred (or can even possibly occur). For example, a desired outcome may be destruction of a portion of all of one or all of the objects involved in the interaction. Thus, in 150, the energy and other parameters associated with the particles in the system are examined (after the computations made at 140) to determine whether it meets certain criteria indicative of the desired outcome. The object discretization involves generating data describing particles that represent each of the objects (at least first and second objects) from geometric data for the objects, wherein the data for each particle describes a mass, density, velocity, energy, pressure and stress at a position of the corresponding object, to produce a first collection of particles representing the first object and a second collection of particles representing the second object.

If the desired outcome has not yet occurred (and there are not indications determined at 150 that it will not likely occur) then the time step is incremented at 160 and the process 100 is repeated from 120. Thus, the object discretization process 110 is performed once to establish the data for the collection of particles representing the objects in the computations for time t=0, just prior to actual interaction of the collection of particles representing the objects.

The processes referred to in the flow chart of FIG. 2 may be performed by one or more computers 200(1) to 200(N). Moreover, the techniques described herein may be embodied by instructions stored on a computer readable medium that, when executed by a computer, cause the computer to perform the various steps described herein.

One computer simulation algorithm that uses the particles-based representation of the objects employs a so-called physics model using smooth particle hydrodynamics (SPH) to approximate variables over finite domains of compact support. SPH is a LaGrangian technique originally formulated to solve astrophysics problems, but has been expanded and enhanced to include material strength effects making the method attractive for hypervelocity impact problems.

SPH does not rely on a traditional grid to quantify node relationships but rather uses interpolation theory to compute smooth field variables at discrete spatial locations throughout the computational domain. Using the theory, the function f at the spatial location, r, may be approximated as:

$$\langle f(r) \rangle = \int f(r_j) W(\vec{r} - \vec{r}_j, h) d\vec{r} \tag{1}$$

where $r_j$ is a new independent variable and W is an appropriate weighting function usually chosen to have the following properties:

$$\int_{-2h}^{2h} W(\vec{r}_i - \vec{r}_j, h) d\vec{r} = 1 \tag{2}$$

$$W(\vec{r}_i - \vec{r}_j, h) = 0 \text{ for } |\vec{r}_i - \vec{r}_j| \geq 2h \tag{3}$$

$$\lim_{h \to 0} [W(\vec{r}_i - \vec{r}_j, h)] = \delta(\vec{r}_i - \vec{r}_j, h) \tag{4}$$

and where h is a so-called smoothing length that defines the region of compact support known as the Kernel and δ is the Delta function. The first and second properties ensure compact support while the third property ensures convergence. Although many different functions satisfy the above three properties, one such function is the $3^{rd}$ order B-spline function.

Equation (1) may be converted to a summation if the function, f(r), is only known at discrete points of corresponding volume ($m_j/\rho_j$) where $m_j$ and $\rho_j$ are the mass and density of interpolation point, j, respectively. Details of the derivation are known in the literature and are not repeated here. The resulting summation is:

$$\langle f(r) \rangle = \sum_{j=1}^{N} \frac{m_j}{\rho_j} f(r_j) W(\vec{r} - \vec{r}_j) d\vec{r} \qquad (5)$$

Gradients of the function, f(r), may also be converted to summations. The resulting expression is given below.

$$\nabla \langle f(r) \rangle = \sum_{j=1}^{N} \frac{m_j}{\rho_j} f(r_j) \nabla W(\vec{r} - \vec{r}_j) d\vec{r} \qquad (6)$$

Together equations (5) and (6) form the basis of the SPH method and allow the partial differential equations of the Newtonian conservation laws to be transformed into discrete summations of neighboring interpolation points.

These interpolation points are the particles referred to above. At every time step, the density, velocity, and energy of each particle are updated by solving appropriate conservation of mass, momentum, and energy equations. Particle positions are updated by integrating particle velocities over time steps selected to satisfy stability criteria. The conservation laws and the resulting particle relationships employed are provided in Table 1.

TABLE 1

Conservation Laws

| Property | Governing Relationship | Particle Relationship |
|---|---|---|
| Mass | $\dfrac{D\rho}{Dt} = -\rho \dfrac{\partial v^\alpha}{\partial x^\alpha}$ | $\dfrac{D\rho_i}{Dt} = -\sum_j m_j (v_{ji}^\beta) \dfrac{\partial W_i}{\partial x^\beta}$ |
| Momentum | $\rho \dfrac{Dv^\alpha}{Dt} = \dfrac{\partial \sigma^{\alpha\beta}}{\partial x^\beta}$ | $\dfrac{Dv_i^\alpha}{Dt} = \sum_j m_j \left( \dfrac{\sigma_i^{\alpha\beta}}{\rho_i^2} + \dfrac{\sigma_j^{\alpha\beta}}{\rho_j^2} \right) \dfrac{\partial W_i}{\partial x^\beta}$ |
| Energy | $\rho \dfrac{De}{Dt} = -P \dfrac{\partial v^\alpha}{\partial x^\alpha} + S^{\alpha\beta} \dfrac{\partial v^\alpha}{\partial x^\beta}$ | $\dfrac{De_i}{Dt} = -\sum_j \dfrac{m_j P_j}{\rho_j^2} (v_{ji}^\beta) \dfrac{\partial W_i}{\partial x^\beta} + \dfrac{1}{2} \sum_j \dfrac{m_j S_j^{\alpha\beta}}{\rho_j^2} \left[ (v_{ji}^\alpha) \dfrac{\partial W_i}{\partial x^\beta} + (v_{ji}^\beta) \dfrac{\partial W_i}{\partial x^\alpha} \right]$ |
| Position | $\dfrac{Dx^\alpha}{Dt} = v^\alpha$ | $\dfrac{Dx_i^\alpha}{Dt} = v_i^\alpha$ | where subscripts i and j refer to individual and neighbor particles, respectively, and $v_{ji}=v_j-v_i$.

The artificial viscosity is included in both the energy and momentum conservation equations. The artificial viscosity contains a bulk viscosity to suppress post-shock velocity oscillations and a Neumann-Richtmeyer viscosity to dissipate shock energy. Weighting functions of the two forms, $\alpha$ and $\beta$, are taken to be unity.

Each particle's sound speed is updated at every time step via the following relationship:

$$C_{s,i}^2 = \left(\frac{\partial P_i}{\partial \rho_i}\right)_s \quad (7)$$

where the partial derivative of pressure with respect to density is evaluated with respect to constant entropy.

The stress tensor, strain rate tensor, rotation rate tensor, constitutive relationship and equation of state employed are listed in Table 2 along with accompanying particle relationships. The time rate of change of the stress deviator tensor is provided via the well known Jaumann rate equation. All materials are assumed to behave elastic-plastic with material failure checked against the von Mises yield criteria. For plastic deformations, an appropriate flow rule is used to relax stresses to the yield surface. The Mie-Gruneisen equation of state relates pressure to material density and internal energy.

Any number of schemes known in the art may be used for integrating the system of equations. However, one technique is a scheme that is accurate to the order of $(\Delta t)^2$. To help boost run time statistics, the total number of particles in the computational mesh representing the two or more objects is minimized using sectorization and neighbor generation process 120 described in more detail in conjunction with FIGS. 3-12.

The main computational expense of the SPH computer simulation technique is searching for neighbor particles for each particle in the computational mesh. Location and identification of each particle's neighbor particles is necessary when executing the computations for the conservation equations in order to precisely model the interaction of the objects. For example, in a typical calculation, the neighbor search process can account for 50 to 60 percent of total computational time. Obviously, increasing the efficiency of this aspect of the computer simulation process can significantly boost run time statistics.

Figure 3:
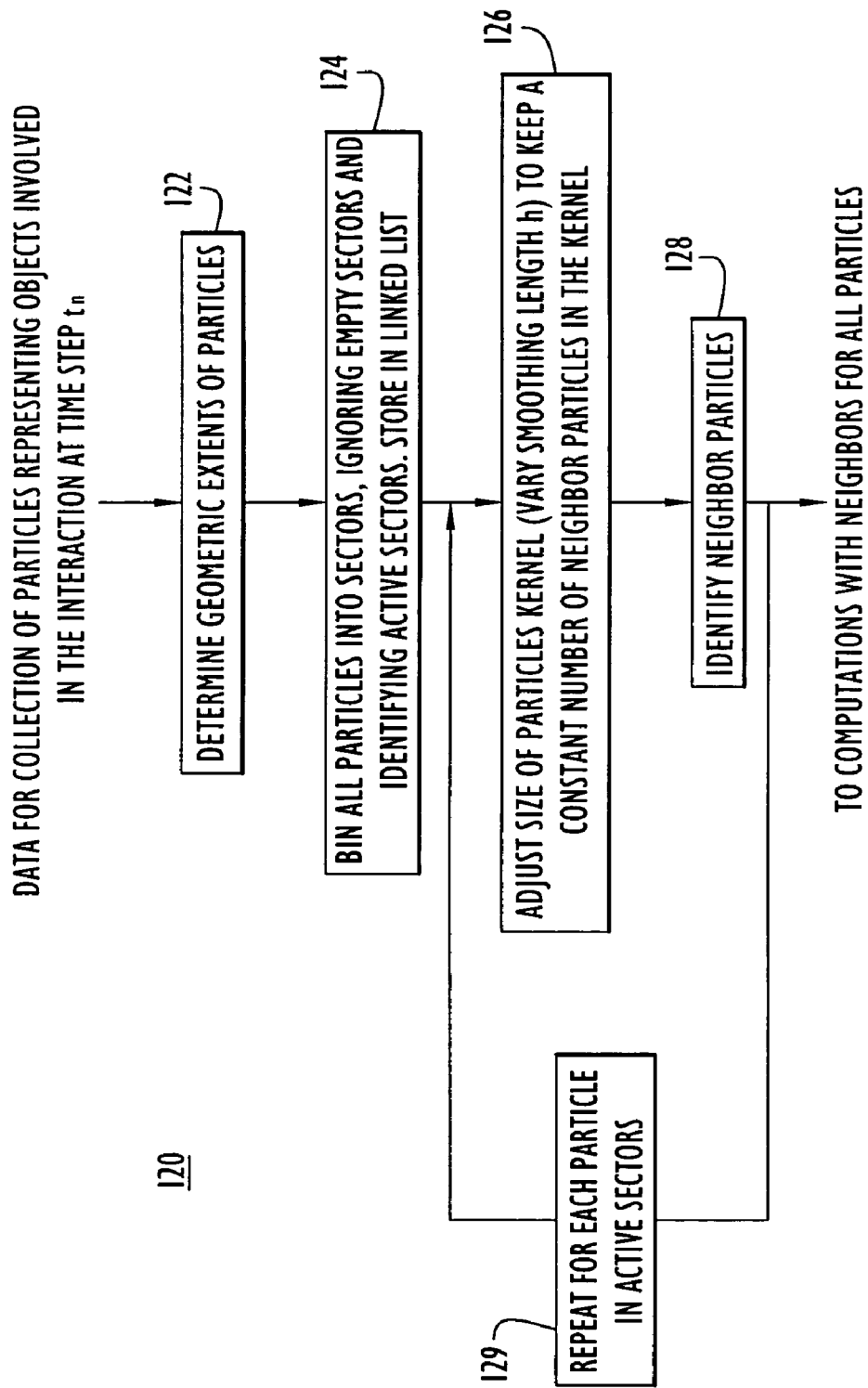
FIG. 3 is a flow chart depicting a process for generating a computational mesh comprising particles grouped in sectors and in which neighboring particles are determined for each particle in the computational mesh, according to an embodiment of the present invention.

With reference to FIG. 3, at the current time step ($t_n$), the geometric extents of the system of particles representing the objects is determined at 122. At time t=0, this is simply determining the geometric extents of the two objects at the point of closest approach, just prior the interaction of the objects. At some time step beyond t=0, the geometrical extents may be defined by the movements of the outermost particles.

Next, at 124, the particles are binned or grouped into sectors based on their spatial positions. The sectors are volume

TABLE 2

| | Constitutive Relationships and Equation of State | |
|---|---|---|
| Property | Governing Relationship | Particle Relationship |
| Stress Tensor | $\sigma^{\alpha\beta} = S^{\alpha\beta} - \delta^{\alpha\beta} P$ | $\sigma_i^{\alpha\beta} = S_i^{\alpha\beta} - \delta^{\alpha\beta} P_i$ |
| Strain Rate Tensor | $d^{\alpha\beta} = \frac{1}{2}\left(\frac{dv^\alpha}{dx^\beta} + \frac{dv^\beta}{dx^\alpha}\right)$ | $d_i^{\alpha\beta} = \frac{1}{2}\sum_j \frac{m_j}{\rho_j}\left[(v_{ji}^\alpha)\frac{\partial W_i}{\partial x^\beta} + (v_{ji}^\beta)\frac{\partial W_i}{\partial x^\alpha}\right]$ |
| Rotation Rate Tensor | $R^{\alpha\beta} = \frac{1}{2}\left(\frac{dv^\alpha}{dx^\beta} + \frac{dv^\beta}{dx^\alpha}\right)$ | $R_i^{\alpha\beta} = \frac{1}{2}\sum_j \frac{m_j}{\rho_j}\left[(v_{ji}^\alpha)\frac{\partial W_i}{\partial x^\beta} - (v_{ji}^\beta)\frac{\partial W_i}{\partial x^\alpha}\right]$ |
| Constitutive Relationship | $\sigma^{\alpha\beta,\nabla} = \frac{D}{Dt}\sigma^{\alpha\beta} + R^{k\alpha}\sigma^{k\beta} + R^{r\beta}\sigma^{\alpha r}$ | $\frac{dS_i^{\alpha\beta}}{dt} = 2G\left(d_i^{\alpha\beta} - \frac{1}{3}\delta^{\alpha\beta}d_i^{kk}\right) + R_i^{\alpha k}S_i^{k\beta} + R_i^{\beta r}S_i^{\alpha r}$ |
| Equation of State | $P = P_H\left(1 - \frac{\Gamma_0}{2}\eta\right) + \Gamma_0 \rho_0 e$ | $P_i = P_{H,i}\left(1 - \frac{\Gamma_{0,i}}{2}\eta_i\right) + \Gamma_{0,i}\rho_{0,i}e_i$ | where $P_H$ refers to the Hugoniot pressure and $\eta$ is the compression ratio $(1-\rho_0/\rho)$.

Figure 4:
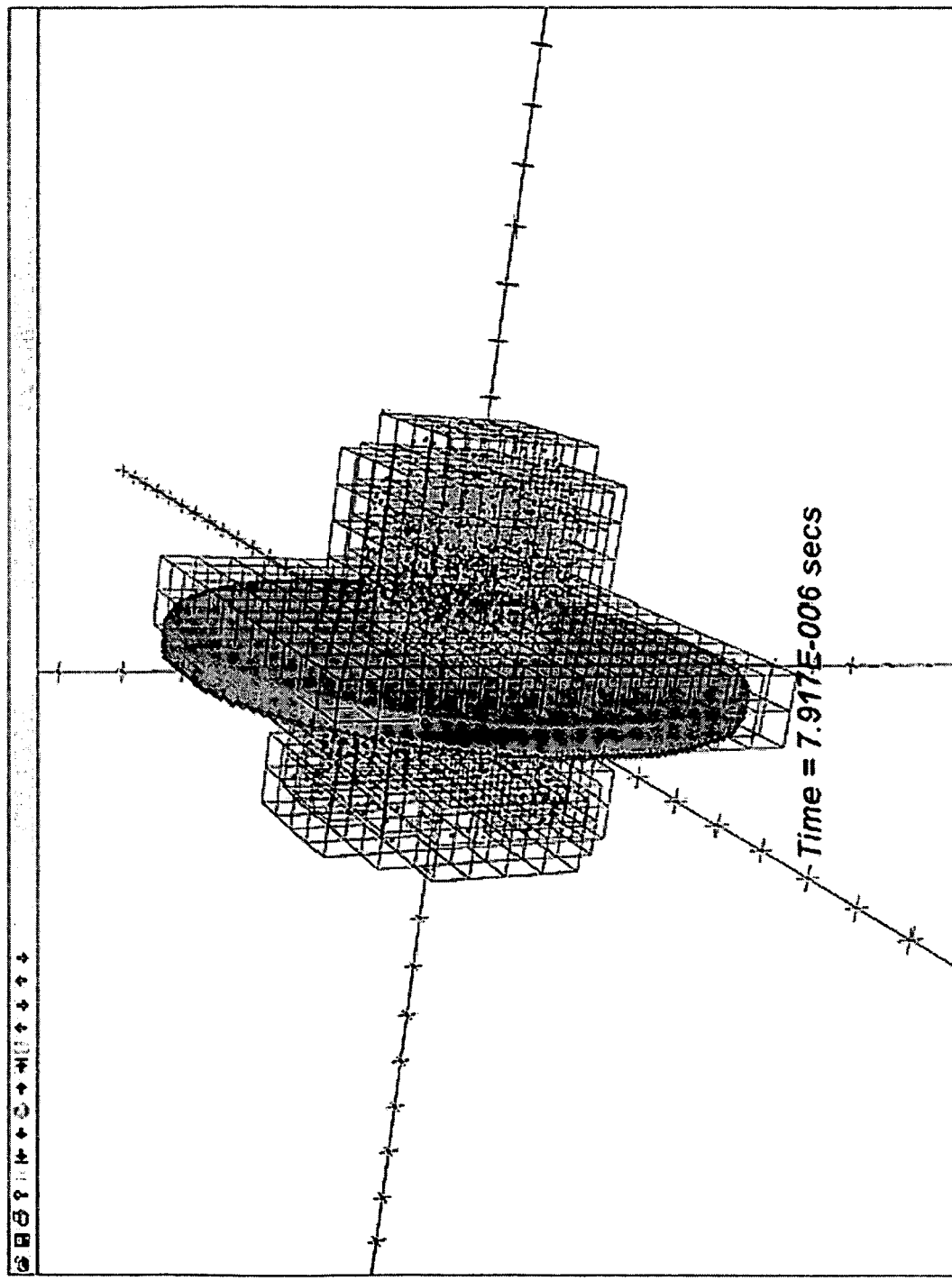
FIG. 4 is a screen shot showing how particles representing two objects are grouped into sectors in the process of FIG. 3 according to an embodiment of the present invention.
Figure 5:
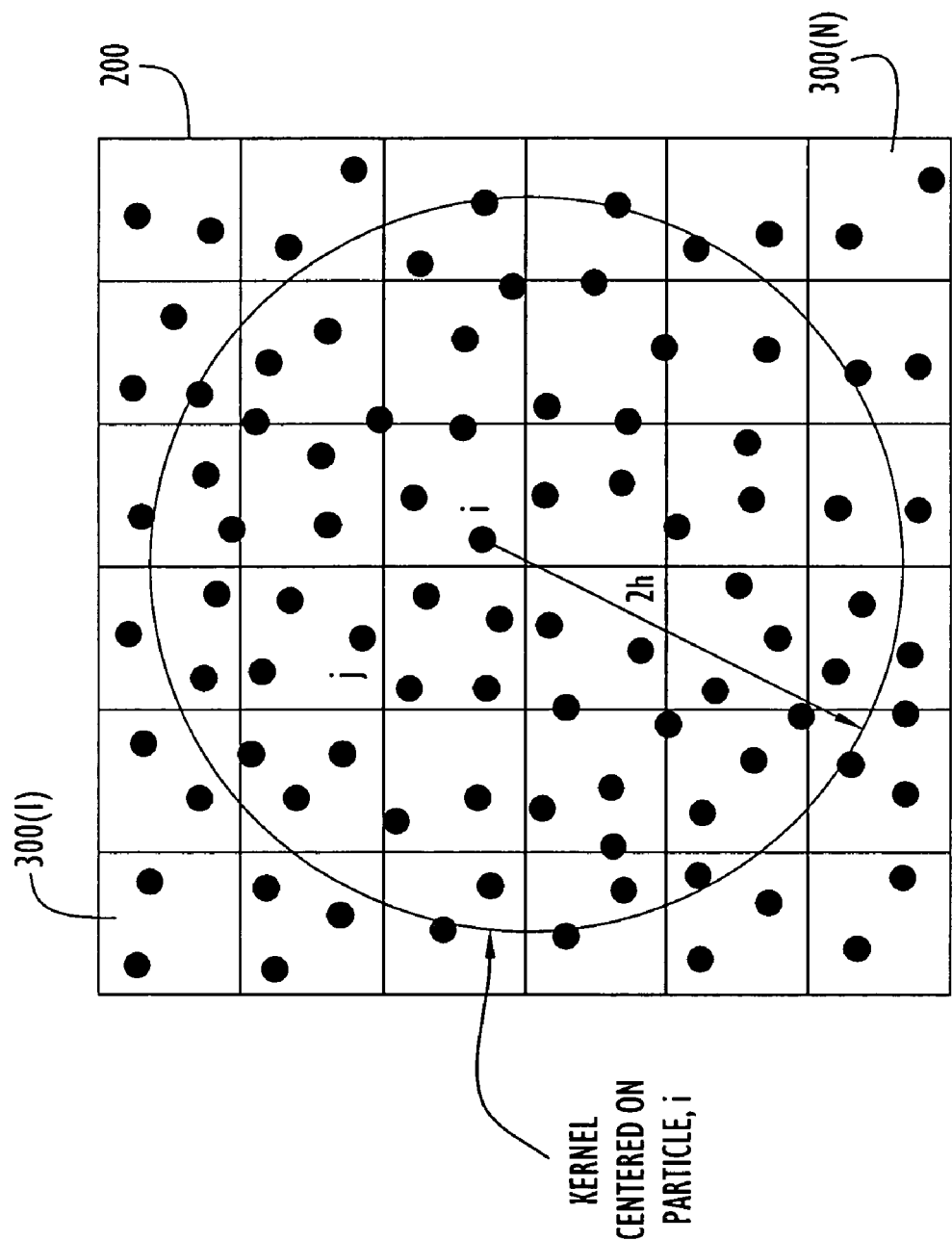
FIG. 5 is a diagram showing how neighbor particles are identified for a particle in the process of FIG. 3 according to according to an embodiment of the present invention.

Numerical stability is assured by satisfaction of the Courant condition. One technique selects appropriate time steps based on the minimum ratio of smoothing length to sound speed, smoothing length to particle velocity, and square root of the ratio of smoothing length to particle acceleration for all particles within the computational domain at every time step.

$$\Delta t = \sum_{i=1}^{N} \min\left[\left(\frac{h_i}{C_{s,i}}\right), \left(\frac{h_i}{v_i}\right), \sqrt{\frac{h_i}{a_i}}\right] \quad (8)$$

regions that may have any shape. In one example, the sectors have the shape of parallelepipeds, e.g., rectangular volume regions and more specifically cube-shaped regions. The x-, y- and z-dimensions of the sectors are a function of the overall geometric extents determined at 122. The dimensions of the sectors are the same size for a given time step. The dimensions of the sectors can be different across time steps, but generally are proportional to the geometric extents so that the larger the geometric extents, the bigger the dimensions are for the sectors. In addition, at 124, sectors that have no particles in them, so called empty sectors, are ignored, whereas sectors having one or more particles having a non-trivial velocity or stress (pressure), e.g., a velocity and/or stress value greater than a corresponding predetermined amount or value, are considered "active sectors". Active sectors may be further classified as primary or secondary. The criteria for calling a sector "active", referred to herein as the "activation criteria", is a sector that has at least one particle with a non-trivial amount of velocity, stress or pressure. Such a "non-trivial" amount depends on the particular physical experiment being modeled but is generally an amount greater than a certain threshold or amount. A primary active sector has non-trivial velocity or stress (pressure). Secondary active sector are those sectors "touched" by a primary active sector. A primary sector can spawn secondary active sectors, but a secondary active sector cannot spawn further secondary active sectors. The active sectors (primary and secondary) are identified as well in 124 and stored in a linked list. A screen shot showing a three-dimensional view of a sectorized computational mesh is shown in FIG. 4, where one object, an aluminum sphere, impacts another object, an aluminum plate. The neighbor searching process in the next step 126 is limited to finding neighboring particles only for particles that are in the active sectors determined in 124. However, the neighboring particles themselves may be in an inactive sector. Particles residing in an active sector at a given time step are referred to hereinafter as select particles.

Each particle in the computational mesh has a smoothing length, h, which defines a region (e.g., having a sphere shape) of influence around the particle. This sphere of influence for a particle is called the Kernel. At 126, the size of a particle's Kernel is adjusted by varying the smoothing length, h, in order to maintain a constant number of neighbor particles in the Kernel for a given particle. To expedite the re-sizing process, the search region for neighboring particles is limited to sectors in the Kernel from the previous time step and those sectors in contact with or bordering the particle's Kernel from the previous time step. Thus, a bounding volume region that limits this search region is determined as shown at reference numeral 200 in the two-dimensional representation in FIG. 5. The bordering sectors are those sectors 300(1) to 300(N) within the bounding volume region 200. A sort routine identifies X number of neighbor particles, such as 55, that are closest to the particle in question and the smoothing length is chosen such that:

$$h = \frac{1}{2}|\vec{r}_{j,55} - \vec{r}_i| \quad (10)$$

Thus, once the search region limits are determined by the bounding volume region 200, the search and identification of neighbor particles j for particle i is performed at 128 in the bounding volume region. This aspect of the process greatly reduces the run time of the computer simulation.

This process is repeated for each particle in the active sector, as shown at 129 until the neighbors are determined for all particles in all active sectors. The data representing the neighbor particles for all particles in the active sectors are then returned to the computations at 140 (FIG. 2).

To avoid excessively large Kernels, smoothing lengths for individual particles are not allowed to exceed a predetermined size, such as three times the average initial smoothing length of all particles in the computational domain. Even though a particle j may be considered for purposes of a neighbor search for particle i, particle j may be in a sector that is not an active sector and thus a neighbor search is not performed for particle j.

At each time step, a new sector mesh is defined based on the extents of the active particles within the system and on an expanded zone around the geometry of a particular portion of one of the object, a so called target zone. Additionally, sectors that are not active (primary or secondary) sectors are excluded from kernelling (steps 126 and 128 in FIG. 3). This allows the sector mesh to concentrate in the area of need.

Figure 6:
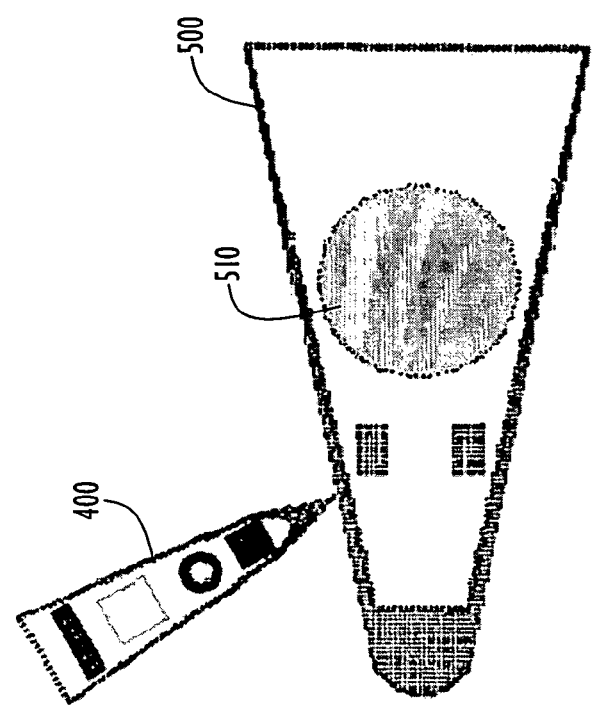
FIG. 6 is a screen shot of an initial material plot of an exemplary engagement of two objects according to an embodiment of the present invention.
Figure 7:
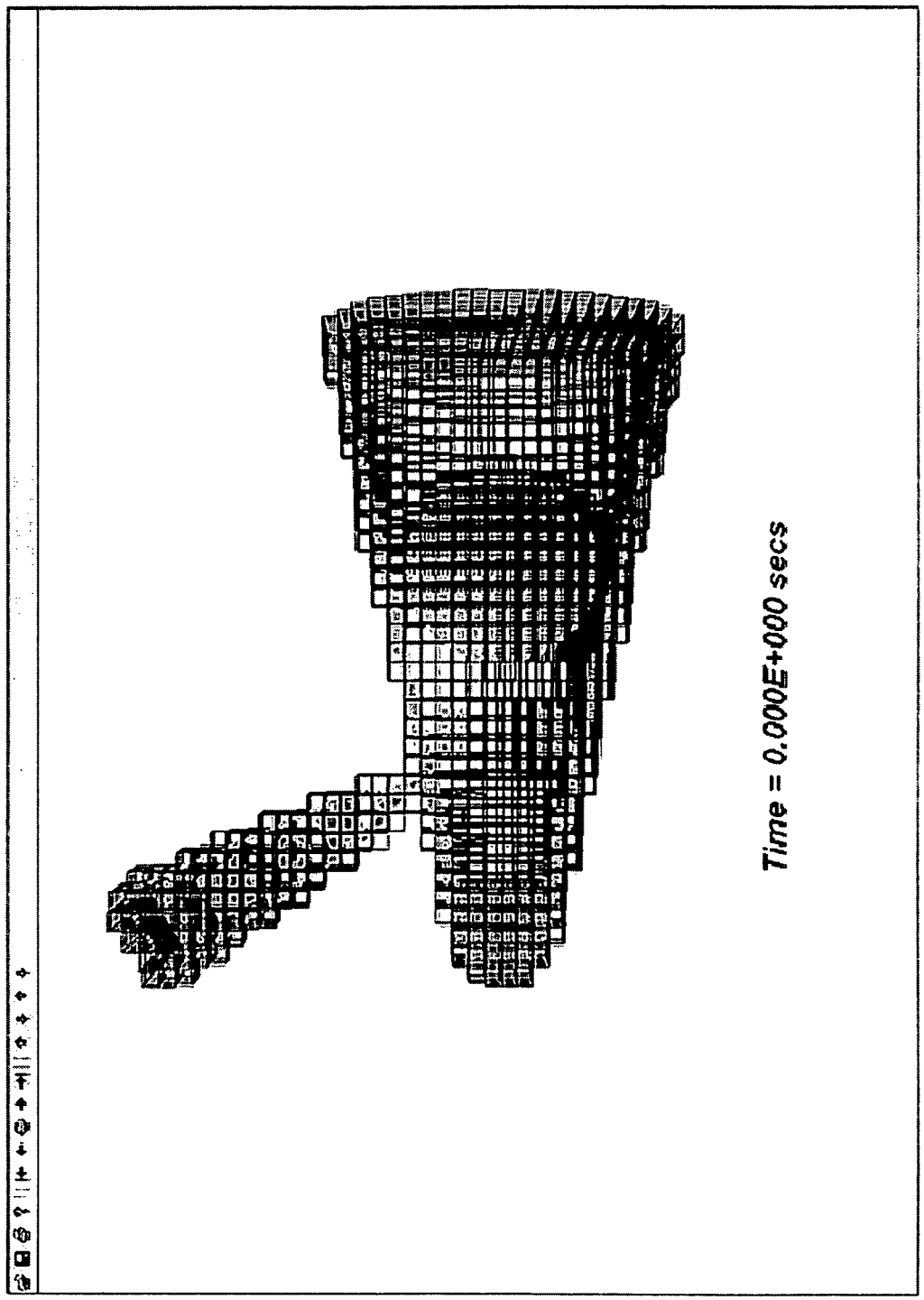
FIGS. 7-12 are screen shots of the computation sector mesh at time steps of for the exemplary engagement of the two objects shown in FIG. 6 according to an embodiment of the present invention.
Figure 8:
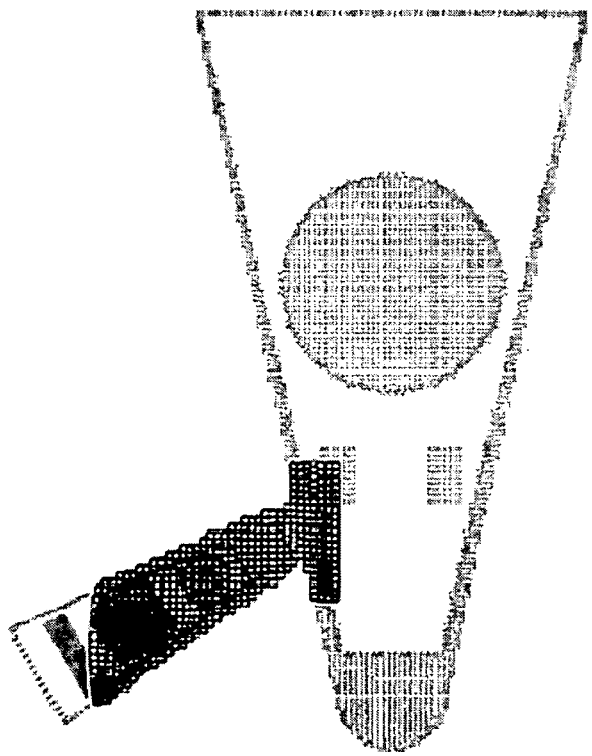
Figure 9:
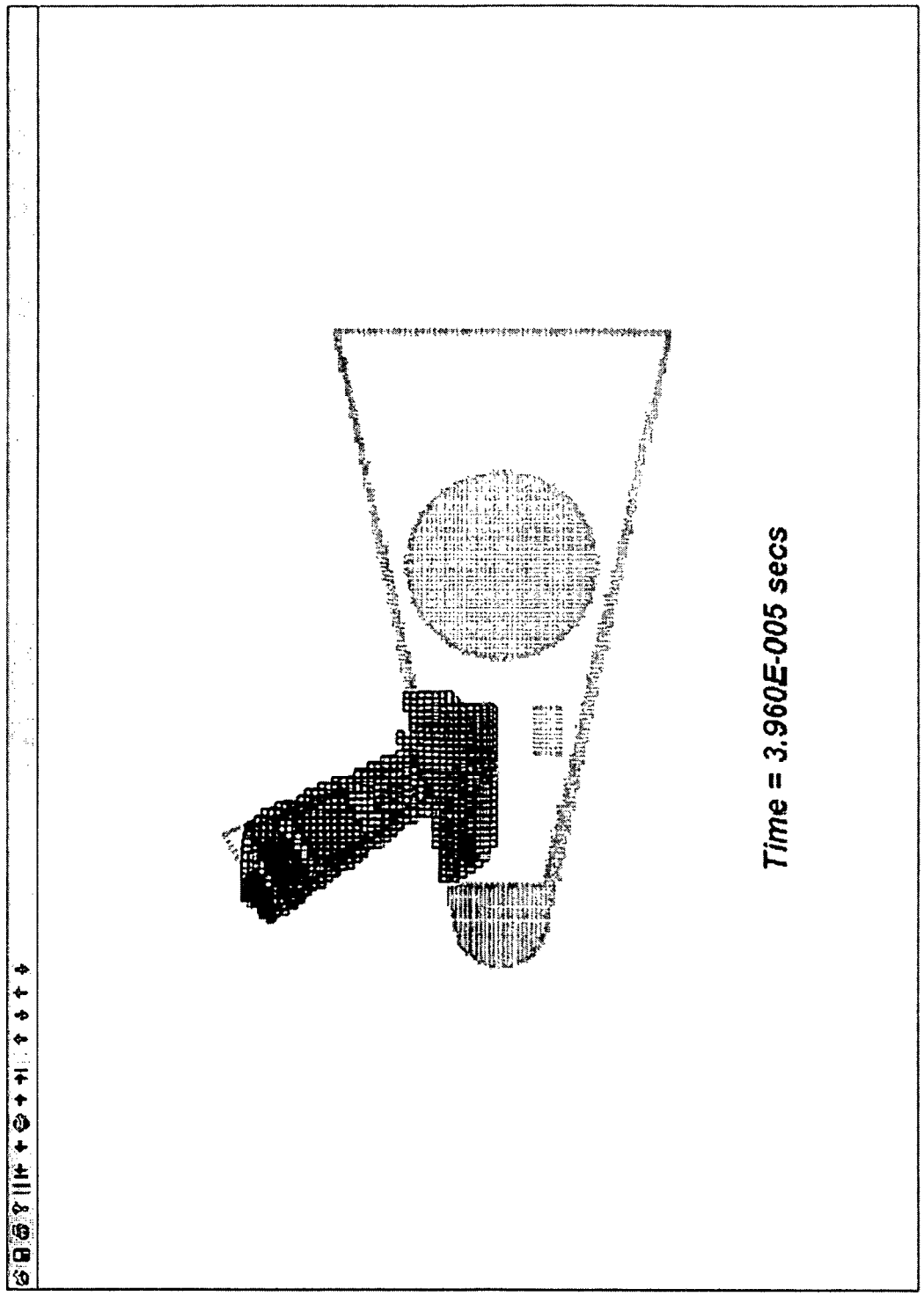
Figure 10:
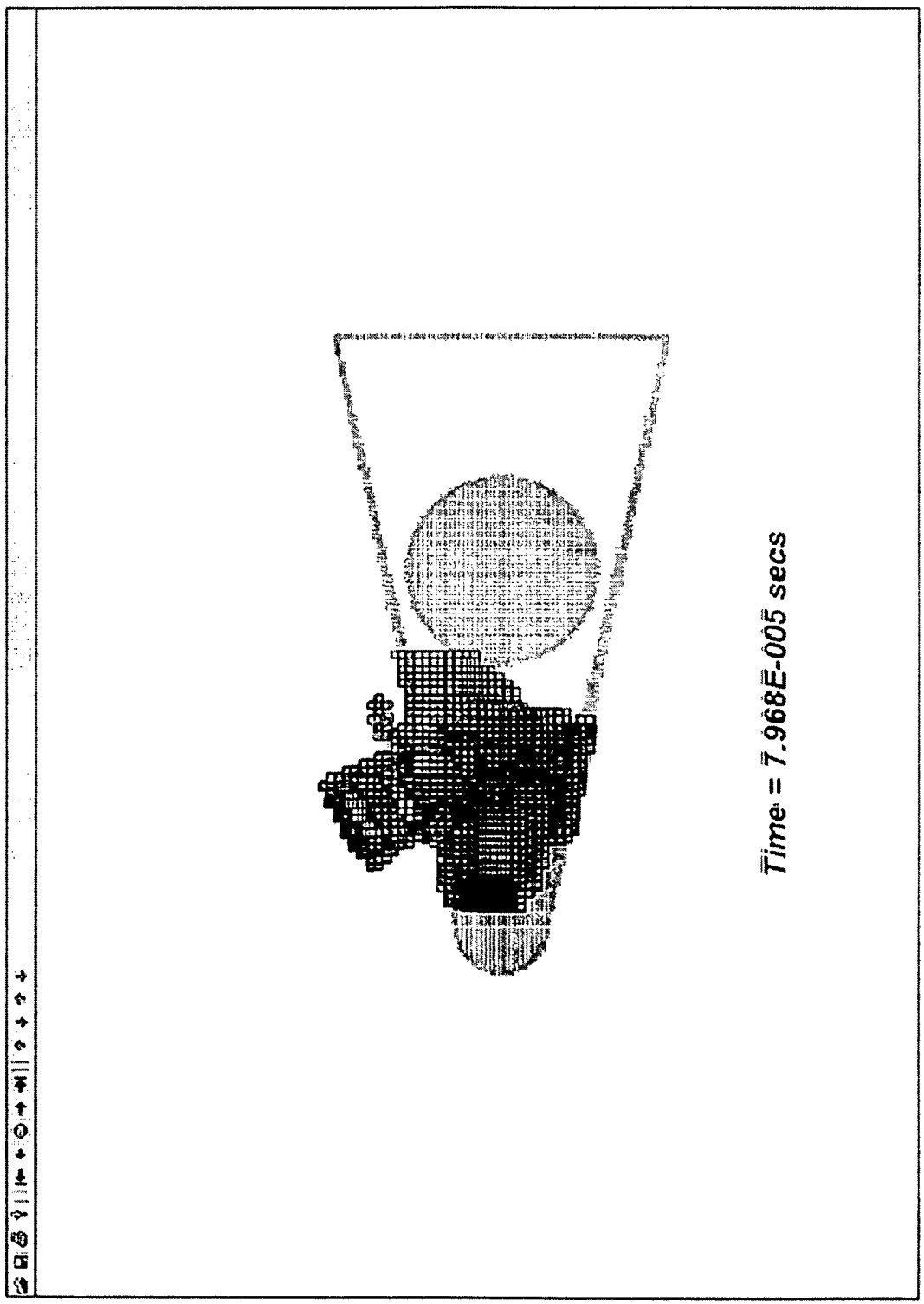
Figure 11:
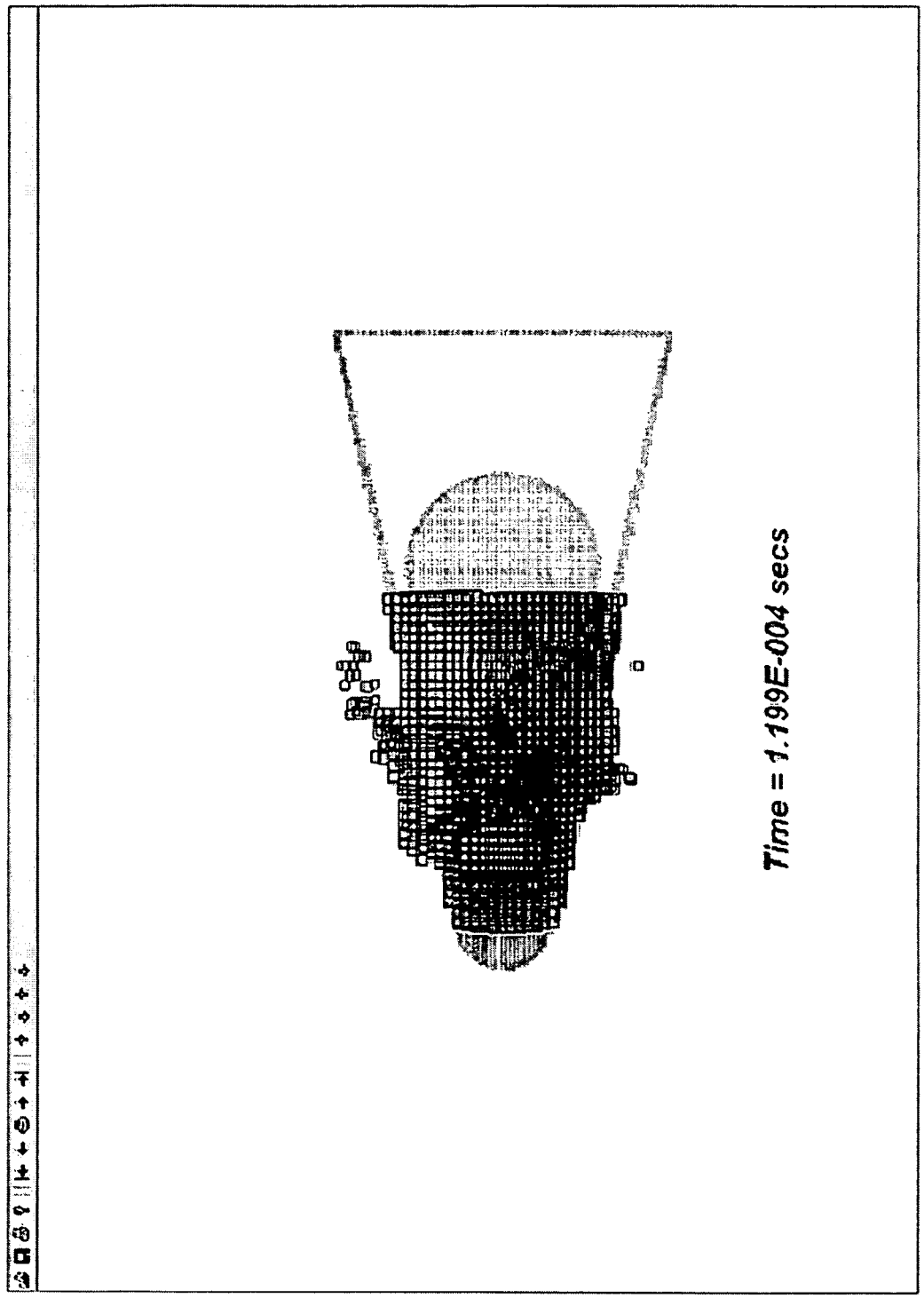
Figure 12:
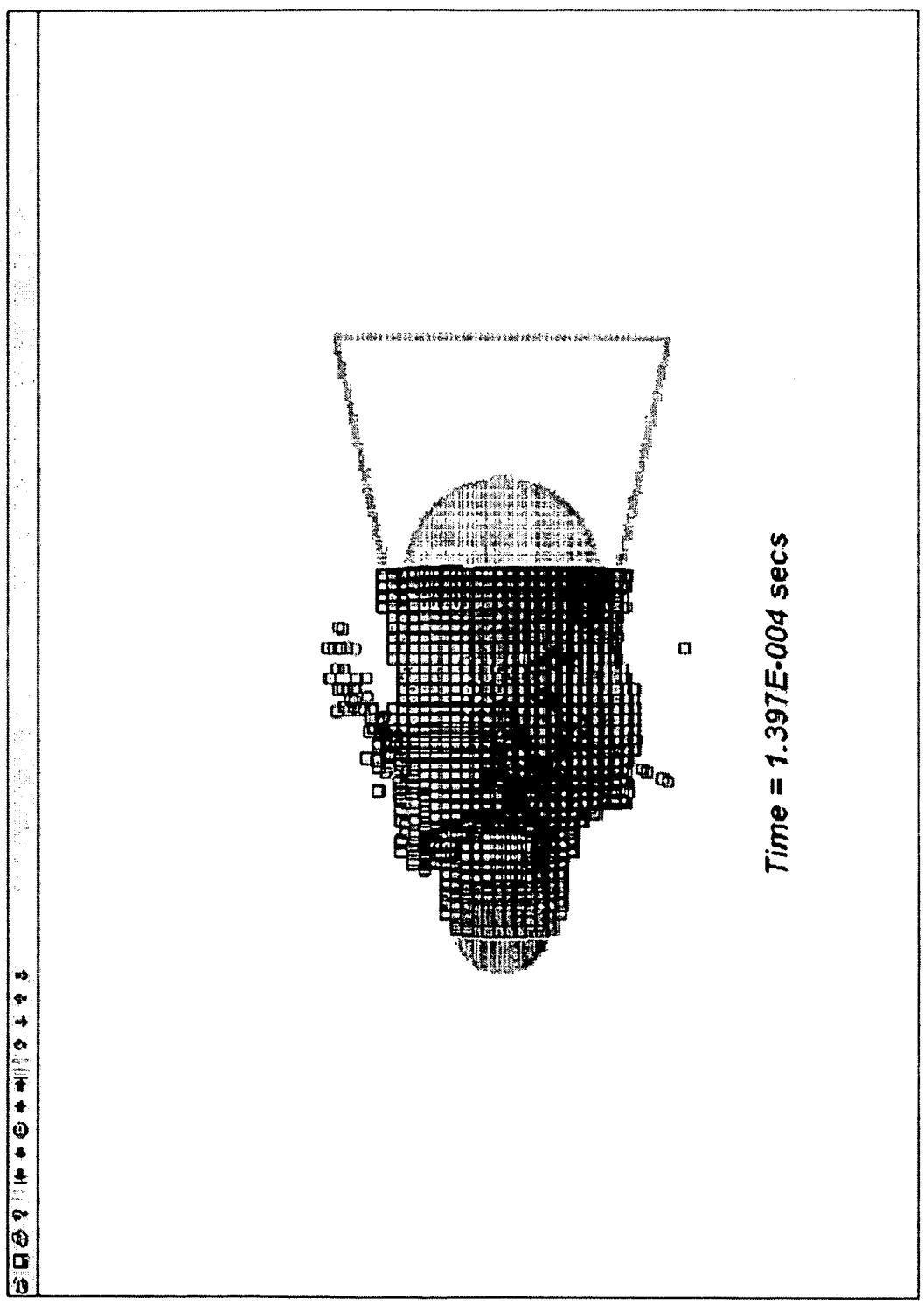

FIGS. 7 through 12 show a time progression of sector mesh growth from t=0 to t=139.7 µsec for the engagement of two objects 400 and 500 shown in FIG. 6. FIG. 7 shows the initial sectorization of the particles represent objects 400 and 500 (at time t=0), and indicates that just before engagement all of the particles for both objects are considered part of the computational mesh. FIG. 8 shows that there are some particles for object 400 that are not part of the computational mesh because they do not have sufficient velocity or pressure associated with them at that point in time in the simulation. However, it is noteworthy that the particles representing the end of the object 400 remote from the engagement with object 500 that are initially outside of the computational mesh in FIGS. 8 and 9 become part of the computational mesh as the simulation proceeds and those particles become involved in the engagement. Also noteworthy is that the dimensions of the sector bins grow proportionally to the geometric limits of the computational mesh. The computation mesh becomes larger as the first object 400 makes further progress into the second object 500 and all of the particles from the first object 400 become active and more particles of the second object 500 become active, as shown in FIGS. 10, 11 and 12.

In sum, the computer simulation run time is significantly reduced by employing a refined sector mesh that focuses computational resources in the highest need areas (those particles that are most relevant to the engagement of the objects at a particular time step) and therefore reducing the number of particles in the computational mesh at a given time step.

The system and methods described herein may be embodied in other specific forms without departing from the spirit or essential characteristics thereof. The foregoing embodiments are therefore to be considered in all respects illustrative and not meant to be limiting.

What is claimed is:

1. A computer-implemented method for simulating interaction of at least first and second objects, comprising:
   a. generating data describing particles that represent each of the first and second objects from geometric data for the first and second objects, wherein the data for each particle describes a mass, density, velocity, pressure, stress and energy at a position of the corresponding object, to produce a first collection of particles representing the first object and a second collection of particles representing the second object;
   b. grouping particles into sectors to define a computational mesh comprising a plurality of sectors, wherein each sector is a volume region at a position in space;
   c. for each of a plurality of select particles, determining neighboring particles that are within a region of influence with respect to each select particle;
   d. performing computations pertaining to the interaction of particles in said computational mesh based on the neighboring particles determined for each of the plurality of select particles to produce for a time step updated data for mass, velocity, energy and position for the particles; and
   e. repeating (b) through (d) for each of a plurality of time steps;
   wherein (c) determining at a current time step comprises searching through particles that are within a bounding volume region comprised of sectors that are within the region of influence at a previous time step and within those sectors in contact with or bordering the region of influence from the previous time step.

2. The method of claim 1, wherein (c) determining neighboring particles comprises identifying a predetermined number of a plurality of particles that are closest to the select particle within said bounding volume region.

3. The method of claim 1, wherein (c) determining further comprises identifying said plurality of select particles as particles that reside in an active sector, wherein an active sector is a sector that comprises at least one particle that is actively involved in the engagement between the first and second objects.

4. The method of claim 3, wherein identifying comprises identifying said plurality of select particles as particles that are within a sector that contains, or is adjacent to a sector that contains, at least one particle that has a velocity, pressure or stress greater than a corresponding predetermined amount.

5. The method of claim 1, wherein (c) determining comprises adjusting a size of the region of influence such that there are a constant number of neighboring particles for each of said plurality of select particles.

6. The method of claim 1, wherein (c) determining comprises determining neighboring particles that are within a region of influence that has a spherical shape.

7. The method of claim 6, wherein (c) determining comprises adjusting a radius of said region of influence such that there are a constant number of neighboring particles for each of said plurality of select particles.

8. The method of claim 1, wherein (d) performing comprises performing computations based on laws of conservation of mass, energy and momentum.

9. The method of claim 1, wherein (b) grouping comprises binning particles into sectors, and wherein each sector is a rectangular volume region, and wherein said bounding volume region is rectangular.

10. The method of claim 1, wherein (b) grouping comprises determining geometric extents for said first and second collections of particles prior to grouping into said plurality of sectors.

11. The method of claim 10, wherein (b) grouping comprises binning particles into sectors, and wherein each sector is a rectangular volume region having dimensions that are based on the geometric extents for said first and second collections of particles.

12. The method of claim 1, wherein (d) determining neighboring particles comprises identifying a predetermined number of a plurality of particles that are closest to the select particle within said bounding volume region.

13. The method of claim 1, wherein (d) determining comprises adjusting a size of the region of influence such that there are a constant number of neighboring particles for each of said plurality of select particles.

14. The method of claim 1, wherein (d) determining comprises determining neighboring particles that are within a region of influence that has a spherical shape.

15. The method of claim 14, wherein (d) determining comprises adjusting a radius of said region of influence such that there are a constant number of neighboring particles for each of said plurality of select particles.

16. The method of claim 1, wherein (e) performing comprises performing computations based on laws of conservation of mass, energy and momentum.

17. The method of claim 1, wherein (b) grouping comprises binning particles into sectors, and wherein each sector is a rectangular volume region, and wherein said bounding volume region is rectangular.

18. The method of claim 1, wherein (b) grouping comprises determining geometric extents for said particles prior to grouping into said plurality of sectors.

19. The method of claim 18, wherein (b) grouping comprises binning particles into sectors, and wherein each sector is a rectangular volume region having dimensions that are based on the geometric extents for said particles.

20. A computer-implemented method for simulating interaction of at least first and second objects, comprising:
 a. generating data describing particles that represent each of the first and second objects from geometric data for the first and second objects, wherein the data for each particle describes a mass density, velocity, pressure, stress and energy at a position of the corresponding object, to produce a first collection of particles representing the first object and a second collection of particles representing the second object;
 b. grouping particles into sectors to define a computational mesh comprising a plurality of sectors, wherein each sector is a volume region at a position in space;
 c. identifying a plurality of select particles as those particles that reside in an active sector, wherein an active sector is a sector that contains at least one particle that is actively involved in the engagement between the first and second objects;
 d. for each of said plurality of select particles, determining neighboring particles that are within a region of influence with respect to each select particle;
 e. performing computations pertaining to the interaction of particles in said computational mesh based on the neighboring particles determined for each of the plurality of select particles to produce for a time step updated data for mass, velocity, energy and position for the particles; and
 f. repeating (b) through (e) for each of a plurality of time steps.

21. The method of claim 20, wherein (c) identifying comprises identifying the plurality of select particles as particles within is a sector that is, or is adjacent to a sector that contains, at least one particle that has a velocity pressure or stress greater than a corresponding predetermined amount.

22. The method of claim 20, wherein (d) determining comprises searching through particles that are within a bounding volume region comprised of sectors that are within the region of influence from a previous time step and within those sectors in contact with or bordering the region of influence from the previous time step.

23. A computer-readable medium storing instructions that, when executed by a computer, cause the computer to:
 a. generate data describing particles that represent each of the first and second objects from geometric data for the first and second objects, wherein the data for each particle describes a mass density, velocity, pressure stress and energy at a position of the corresponding object, to produce a first collection of particles representing the first object and a second collection of particles representing the second object;
 b. group particles into sectors to define a computational mesh comprising a plurality of sectors, wherein each sector is a volume region at a position in space;
 c. for each of a plurality of select particles, determine neighboring particles that are within a region of influence with respect to each select particle;
 d. perform computations pertaining to the interaction of particles in said computational mesh based on the neighboring particles determined for each of the plurality of select particles to produce for a time step updated data for mass, velocity, energy and position for the particles; and
 e. repeat (b) through (d) for each of a plurality of time steps;

wherein the instructions that cause the computer to (c) determine at a current time step comprise instructions that cause the computer to search through particles that are within a bounding volume region comprised of sectors that are within the region of influence from a previous time step and within those sectors in contact with or bordering the region of influence from the previous time step.

24. A computer-readable medium storing instructions that, when executed by a computer, cause the computer to:

a. generate data describing particles that represent each of the first and second objects from geometric data for the first and second objects, wherein the data for each particle describes a mass density, velocity, pressure, stress and energy at a position of the corresponding object, to produce a first collection of particles representing the first object and a second collection of particles representing the second object;

b. group particles into sectors to define a computational mesh comprising a plurality of sectors, wherein each sector is a volume region at a position in space;

c. identify a plurality of select particles as those particles that reside in an active sector, wherein an active sector is a sector that contains at least one particle that is actively involved in the engagement between the first and objects;

d. for each of said plurality of select particles, determine neighboring particles that are within a region of influence with respect to each select particle;

e. perform computations pertaining to the interaction of particles in said computational mesh based on the neighboring particles determined for each of the plurality of select particles to produce for a time step updated data for mass, velocity, energy and position for the particles; and f. repeat (b) through (e) for each of a plurality of time steps.

25. The computer-readable medium of claim 24, wherein the instructions that cause the computer to (c) determine comprises instructions that cause the computer to identify a predetermined number of a plurality of particles that are closest to the select particle within said bounding volume region.

26. The computer-readable medium of claim 24, wherein the instructions that cause the computer to (c) determine comprises instructions that cause the computer to identify said plurality of select particles as those particles that reside in an active sector, wherein an active sector is a sector that comprises at least one particle that is actively involved in the engagement between the first and second objects.

27. The computer-readable medium of claim 26, wherein the instructions that cause the computer to identify comprises instructions that cause the computer to identify said plurality of select particles as particles that are within a sector that contains, or is adjacent to a sector that contains, at least one particle that has a velocity, pressure or stress greater than a corresponding predetermined amount.

28. The computer-readable medium of claim 24, wherein the instructions that cause the computer to (c) determine comprise instructions that cause the computer to adjust a size of the region of influence such that there are a constant number of neighboring particles for each of said plurality of select particles.

29. The computer-readable medium of claim 24, wherein the instructions that cause the computer to group comprise instructions that cause the computer to bin particles into sectors, wherein each sector is a rectangular volume region, and wherein said bounding volume region is rectangular.

30. The computer-readable medium of claim 24, wherein the instructions that cause the computer to group comprise instructions that cause the computer to determine geometric extents for said first and second collection of particles prior to grouping into said plurality of sectors.

31. The computer-readable medium of claim 30, wherein the instructions that cause the computer to group comprise instructions that cause the computer to bin particles into sectors, wherein each sector is a rectangular volume region having dimensions that are based on the geometric extents for said first and second collection of particles.

* * * * *